(12) United States Patent
Bozzano et al.

(10) Patent No.: US 7,807,114 B2
(45) Date of Patent: *Oct. 5, 2010

(54) REACTOR SYSTEM WITH INTERSTAGE PRODUCT REMOVAL

(75) Inventors: Andrea G. Bozzano, Northbrook, IL (US); Tom N. Kalnes, LaGrange, IL (US); Carl J. Stevens, Lake Forest, IL (US); Steven M. Poklop, Palatine, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/509,792

(22) Filed: Jul. 27, 2009

(65) Prior Publication Data

US 2009/0324463 A1 Dec. 31, 2009

Related U.S. Application Data

(63) Continuation of application No. 11/456,966, filed on Jul. 12, 2006, now Pat. No. 7,582,268.

(51) Int. Cl.
*B01J 8/04* (2006.01)
*B01J 8/08* (2006.01)
*C07C 1/00* (2006.01)

(52) U.S. Cl. ........... 422/192; 422/189; 422/190; 422/191; 422/193; 422/216; 422/236; 585/324; 585/638; 585/921; 585/924

(58) Field of Classification Search ............... 422/189, 422/190, 191, 192, 193, 216, 236; 585/324, 585/638, 921, 924
See application file for complete search history.

(56) References Cited

U.S. PATENT DOCUMENTS 4,975,178 A * 12/1990 Clem et al. ............... 208/65
7,582,268 B1 * 9/2009 Bozzano et al. ............ 422/192

* cited by examiner

*Primary Examiner*—Walter D Griffin
*Assistant Examiner*—Lessanework Seifu
(74) *Attorney, Agent, or Firm*—Arthur E Gooding (57) ABSTRACT

The present invention provides a reactor system having: (1) a plurality of reactors connected in fluid flow communication and having at least one pair of reactors separated by an interstage position; (2) a line for supplying a reactant feed stream separately to an inlet of more than one of the plurality of reactors; and (3) a diverter in fluid communication with the interstage position and capable of directing a first portion of a product stream exiting one reactor in said pair of reactors to a first location and a second portion of the product flow stream to an inlet of another reactor in said pair of reactors.

9 Claims, 3 Drawing Sheets

Fig. 3

REACTOR SYSTEM WITH INTERSTAGE PRODUCT REMOVAL

CROSS-REFERENCE TO RELATED APPLICATION

This application is a continuation of copending U.S. application Ser. No. 11/456,966 filed Jul. 12, 2006, the contents of which are hereby incorporated by reference in its entirety.

FIELD OF THE INVENTION

The present invention relates generally to a reactor system with interstage product removal and more particularly a reactor having a plurality of reactor beds in flow communication with one another and with a diverter for removal of product between a pair of adjacent reactor beds.

BACKGROUND OF THE INVENTION

A major portion of the worldwide petrochemical industry is concerned with the production of light olefin materials and their subsequent use in the production of numerous important chemical products via polymerization, oligomerization, alkylation and the like well-known chemical reactions. Light olefins include ethylene, propylene and mixtures thereof. These light olefins are essential building blocks for the modern petrochemical and chemical industries. The major source for these materials in present day refining is the steam cracking of petroleum feeds. For various reasons including geographical, economic, political and diminished supply considerations, the art has long sought a source other than petroleum for the massive quantities of raw materials that are needed to supply the demand for these light olefin materials. Thus, R & D personnel seek to use alternative feedstocks effectively and selectively to produce light olefins, thereby lessening dependence of the petrochemical industry on petroleum feedstocks. Much attention has been focused on the possibility of using hydrocarbon oxygenates and more specifically methanol or dimethylether (DME) as a prime source of the necessary alternative feedstock. Oxygenates are particularly attractive because they can be produced from such widely available materials as coal, natural gas, recycled plastics, various carbon waste streams from industry and various products and by-products from the agricultural industry. The art of making methanol and other oxygenates from these types of raw materials is well established and typically involves the use of one or more of the following procedures: (1) manufacture of synthesis gas by any of the known techniques typically using a nickel or cobalt catalyst in a steam reforming step followed by the well-known methanol synthesis step using relatively high pressure with a copper-based catalyst; (2) selective fermentation of various organic agricultural products and by-products in order to produce oxygenates; or (3) various combinations of these techniques.

Given the established and well-known technologies for producing oxygenates from alternative non-petroleum raw materials, the art has focused on different procedures for catalytically converting oxygenates such as methanol into the desired light olefin products in order to make an oxygenate to olefin (OTO) process. These light olefin products that are produced from non-petroleum based raw materials must of course be available in quantities and purities such that they are interchangeable in downstream processing with the materials that are presently produced using petroleum sources. Although many oxygenates have been discussed in the prior art, the principal focus of the two major routes to produce these desired light olefins has been on methanol conversion technology primarily because of the availability of commercially proven methanol synthesis technology. Two principal techniques are known in the art for conversion of methanol to light olefins (MTO). U.S. Pat. No. 4,387,263 discloses one MTO processes that utilizes a catalytic conversion zone containing a zeolitic type of catalyst system. The '263 patent reports on a series of experiments with methanol conversion techniques using a ZSM-5 type of catalyst system.

U.S. Pat. No. 4,587,373 discloses using a zeolitic catalyst system like ZSM-5 for purposes of making light olefins. The '373 patent discloses diverting a portion of a methanol feed stream to a DME absorption zone to allow for downsizing of a scrubbing zone.

U.S. Pat. Nos. 5,095,163; 5,126,308 and 5,191,141 disclose an MTO conversion technology utilizing a non-zeolitic molecular sieve catalytic material. More particularly these patents disclose using a metal aluminophosphate (ELAPO) and more specifically a silicoaluminophosphate molecular sieve (SAPO) and even more specifically SAPO-34. This SAPO-34 material was found to have a very high selectivity for light olefins with a methanol feedstock and consequently very low selectivity for the undesired corresponding light paraffins and the heavier materials.

The classical OTO technology produces a mixture of light olefins primarily ethylene and propylene along with various higher boiling olefins. Although the classical OTO process technology possesses the capability of shifting the major olefin product recovered therefrom from ethylene to propylene by various adjustments of conditions maintained in the reaction zone, the art has long sought an oxygenate to propylene (OTP) technology that would provide better yields of propylene relative to the classical OTO technology. The driving force for this shift in emphasis towards propylene is the growth rate of the propylene market versus the growth rate of the ethylene market. The existing sources of propylene production in the marketplace are primarily based on conventional steam cracking of naphtha, LPG streams, propane streams and the like. Another principal source of propylene is produced in a fluid catalytic cracking (FCC) hydrocarbon conversion process in the modern day refinery.

US 2003/0139635 A1 discloses a fixed bed methanol to propylene (MTP) process for selectively producing propylene from a feedstock of methanol and/or DME. This patent application discloses a flow scheme having an oxygenate to propylene (OTP) synthesis portion having three reactors in a parallel flow arrangement with respect to the oxygenate feed and utilize a steam diluent and fixed beds of oxygenate conversion catalysts. The reactors are connected in a serial flow arrangement with respect to the effluents of the first reactor and the second reactor.

EP-B-1025068 discloses using two reaction zones to convert an oxygenate feed and a by-product fraction containing $C_4^+$ hydrocarbons to ethylene and propylene. This patent discloses that the two reaction zones allow for independent selection of catalyst and conversion conditions for each zone. This patent discloses using a non-zeolitic molecular sieve catalyst such as SAPO-34 for an oxygenate to light olefin reaction zone and either a non-zeolitic molecular sieve catalyst or a zeolitic catalyst such as ZSM-5 material for the auxiliary reaction zone which operates to convert the $C_4^+$ by-product fraction to the desired light olefin (i.e., $C_2$ and $C_3$ olefins). The patent discloses using a circulating fluid bed or a riser reaction for the first reaction zone and a fluid bed or a fixed bed or a fixed tube reactor for the second reaction zone.

SUMMARY OF THE INVENTION

The present invention provides a reactor system having: (1) a plurality of reactors connected in fluid flow communication and having at least one pair of reactors separated by an interstage position; (2) a line for supplying a reactant feed stream separately to an inlet of more than one of the plurality of reactors; and (3) a diverter in fluid communication with the interstage position and capable of directing a first portion of a product stream exiting one reactor in said pair of reactors to a first location and a second portion of the product flow stream to an inlet of another reactor in said pair of reactors.

The present invention further provides a system for converting a feed stream including: (1) a reactor vessel defining an inner space; (2) a first annular catalyst chamber in the inner space for containing a first catalyst material; (3) a second annular catalyst chamber in the inner space for containing a second catalyst material; and (4) a line having an inlet and a first outlet and a second outlet, the first outlet for directing a first portion of the feed stream to the first annular catalyst chamber, and the second outlet for directing a second portion of the feed stream past the first annular catalyst chamber and to the second annular catalyst chamber.

The present invention further provides a reactor system for converting a feed stream to a product stream including: (1) a reactor vessel defining an inner space; (2) a first generally cylindrical annular catalyst chamber in the inner space for guiding a flow of a first catalyst material along a portion of a length of the reactor vessel; (3) a second generally cylindrical annular catalyst chamber in the inner space for guiding a flow of a second catalyst material along a portion of the length of the vessel, the first annular catalyst chamber being concentrically positioned within the second annular catalyst chamber; (4) a first annular space defined by and in fluid communication with the first annular catalyst chamber; (5) a second annular spaced positioned between the first annular catalyst chamber and the second annular catalyst chamber, the second annular space being in communication with the second annular catalyst chamber; and (6) a line having an inlet and a first outlet and a second outlet, the first outlet for directing a first portion of the feed stream into the first annular space and the second outlet for directing a second portion of the feed stream into the second annular space.

TERMS AND CONDITIONS DEFINITIONS

The following terms and conditions are used in the present specification with the following meanings: (1) A "portion" of a stream means either an aliquot part that has the same composition as the whole stream or a part that is obtained by eliminating a readily separable component therefrom (e.g., if the stream contains hydrocarbons in admixture with steam, then after condensation of a major portion of the steam, it comprises an aqueous portion and a hydrocarbon portion); (2) the presence of necessary compressors and/or pumps is understood when flow is shown from a zone of relatively low pressure to a zone of higher pressure; (3) the presence of necessary heating and/or cooling means is implied when flow is shown between zones operating at different temperatures; (4) the term "light olefins" means ethylene, propylene and mixtures thereof; (5) the term "heavy olefin" means an olefin having a molecular weight greater than propylene; (6) the expression "OTP" process means a process for converting an oxygenate to propylene and in a preferred embodiment when the oxygenate is methanol the OTP process is referred to as an "MTP" process herein; (7) the term "oxygenate" means an oxygen-substituted aliphatic hydrocarbon containing 1 to 10 carbon atoms include aliphatic alcohols, ethers, and carbonyl compounds (e.g., aldehydes, ketones, carboxylic acids, and the like) and mixtures of these materials; (8) the term "dual-function" means that the OTP catalyst catalyzes both the OTP reactions and an olefin interconversion reactions necessary to convert $C_2$ and $C_4^+$ olefins to propylene; (9) the term "highly unsaturated hydrocarbon" means a hydrocarbon which contains two or more double bonds or a triple bond in its structure; and (10) the term "fluidized bed" means particles of a catalyst are entrained in a pressurized stream of gas or liquid.

DETAILED DESCRIPTION OF THE INVENTION

While the present invention will be discussed in terms of converting an oxygenate feed stream into an olefin-containing feed stream, it should be understood that the reactor flow scheme with interstage product removal could be used to produce products from other types of reactants. For example, it is contemplated the reactor could process pure hydrocarbon feedstreams, or a combination of oxygenates and hydrocarbons. It is also contemplated the product streams could be aromatics and/or olefins. Additionally, it is contemplated that the reactor could process one or more inorganic reagents. For an OTP process the feed stream contains one or more oxygenates. In a preferred form of the invention, the oxygenates include lower straight or branched chain alcohols, and their unsaturated counterparts. More preferably the oxygenates include methanol, dimethyl ether (DME), ethanol, diethyl ether, methylether, formaldehyde, dimethyl ketone, acetic acid, and mixtures thereof. In a most preferred form of the invention, a feed stream contains methanol or dimethylether or mixtures thereof.

In a preferred form of the OTP conversion step, the oxygenate feed is catalytically and selectively converted in a plurality of connected reaction zones to propylene and by-product hydrocarbons containing aliphatic moieties such as—but not limited to—methane, ethane, ethylene, propane, butylene, butane and limited amounts of other higher carbon number aliphatics by contacting the feedstock with a dual-function OTP catalyst at effective OTP conditions. This OTP conversion step also forms minor amounts of highly unsaturated hydrocarbons, such as dienes and acetylenic hydrocarbons, and aromatic hydrocarbons. A diluent is not absolutely required but is a useful option to maintain the selectivity of the OTP catalyst to produce light olefins, particularly propylene. The use of a diluent such as steam can provide certain equipment cost and thermal efficiency advantages as well as lowering the partial pressure of the oxygenate reactants, thereby increasing selectivity to olefins. The phase change between steam and liquid water can also be employed to advantage in transferring heat between the feedstock and the reactor effluent, and the separation of the diluent from the product requires only a simple condensation step to separate water from the light olefin products.

A diluent is thus preferably used in the reaction zones in order to control partial pressure of the oxygenate reactant to provide a heat sink for the net exothermic reactions occurring therein and to shift the overall reaction selectivity towards propylene. Suitable diluents for use in the reaction zones include helium, argon, nitrogen, carbon monoxide, carbon dioxide, hydrogen, water, $C_1$ through $C_5$ paraffins, aromatic hydrocarbons and mixtures of these materials. Preferred diluents are steam, methane, an aromatic compounds, and mixtures thereof. Preferred diluents are relatively inert at the conditions maintained in the reaction zones. An especially preferred diluent is steam since it is relatively easily recovered from the effluent stream utilizing condensation techniques. The amount of diluent used will be selected from the range of 0.1:1 to 12:1 and more typically from about 0.1:1 to 5:1 moles of diluent per mole of oxygenate in order to lower the partial pressure of the oxygenates to a level which favors production of propylene. In a preferred form of the present invention, one or more of the reaction zones will be supplied with a portion of an ethylene-rich by-product stream that contains significant amounts of ethylene and minor amounts of $C_2$ saturated hydrocarbons. More preferably, each of the reaction zones will be individually provided with a portion of the ethylene-rich by-product stream. This $C_2$ olefin recycle stream will thus furnish saturated $C_2$ hydrocarbon diluent to the reaction zone and therefore the amount of diluent that must be added to such ethylene supplied reaction zone or zones in order to achieve the target diluent to oxygenate mole ratio will diminish once the reaction zone or zones are started up and $C_2$ by-product recycle initiated.

The present invention utilizes an optional separate (or second) reaction zone for interconversion of the heavy olefin by-product stream, (i.e., the $C_4^+$ stream) recovered from the effluent from the OTP conversion step.

The conversion conditions used in the reaction zones are carefully chosen to favor the production of propylene from the oxygenate charged in the feed. In a preferred form of the invention, oxygenate conversion temperatures will be from about 350° C. to about 600° C. The lower portion of this oxygenate conversion temperature range with certain catalysts is known to favor the production of propylene with the upper portion favoring the production of ethylene at the expense of propylene. Preferred inlet temperatures into the reaction zones are therefore in the range of 350° to 500° C., more preferably in the range of about 375° to 500° C. and most preferably in the range of 375° to 475° C.

The conversion conditions employed in the optional, separate interconversion reactor is mildly endothermic, the inlet temperature into this interconversion zone is set at a relatively high value reference to the maximum or peak temperature experienced in the OTP reaction zones (which is typically at or near the outlet of the reactor in this zone) since the balance of the OTP reactions and $C_2$ olefin interconversion reactions are strongly exothermic. In a preferred form of the present invention, the inlet temperature into the second reaction zone (or into each reactor if multiple reactors are utilized) is at least 15° C. higher than the maximum temperature reached in the OTP reaction zone. Best results are obtained when this inlet temperature is set so that it is 15° to 25° C., or more, higher than the maximum temperature experienced in the OTP reaction zones.

A diluent may be used in the interconversion reactor to control the partial pressure of the heavy olefin reactant used therein and to provide an additional heat source for the endothermic interconversion reaction. Suitable diluents can be chosen from those previously set forth in connection with the operation of the OTP reaction zones. Preferred diluents include steam, methane, a mixture of aromatic compounds that are by-products of the OTP reaction, and a mixture of $C_6^+$ olefins, paraffins and aromatics that are by-products of the OTP reactions performed in the series of OTP reactors and are typically recovered as an olefin-rich gasoline stream in downstream separation facilities as will be explained in conjunction with the discussion of the figures. Of these preferred diluents, steam involves the risk of hydrothermal deactivation of the dual-function catalyst used in the interconversion reactor if steam is used in high concentration but is typically used because of its ability to control and/or prevent coke formation in heaters, heat exchangers and reactor internals, its ready availability, its ease of separability from the products of the interconversion reaction and because it can be used at a much lower concentration than in the OTP reaction zones. The amount of diluent preferably used in the interconversion reaction zone corresponds 0.001:1 to 1:1 moles of diluent per mole of $C_4^+$ olefin charged to this zone and more preferably to a mole ratio of 0.01:1 to 0.5:1. Unlike the situation with respect to the OTP reaction zones it is to be noted that since $H_2O$ is not a by-product of the $C_4^+$ interconversion reactions performed in the interconversion reactor, there is typically no net make of diluent across this zone so that the effective amount of diluent used in the interconversion reactor is the amount charged thereto. However, it is within the scope of the present invention to charge some oxygenate to the interconversion reactor in an amount sufficient to off-set the endothermic interconversion reactions arising therein.

Both the oxygenate to propylene conversion and the $C_4^+$ olefin interconversion steps are effectively carried out over a wide range of pressures including inlet total pressures between about 0.1 atm (10.1 kPa) up to about 100 atm (10.1 MPa) but it is well known that the formation of lighter olefins like propylene are favored at low pressure conditions. It is thus preferred for both of these steps to use an inlet pressure in the range of about 1 to 4 atm (101.3 to 405 kPa) and best results are achieved at about 136 to 343 kPa (5 to 35 psig).

The contact time of the reactants with the dual-function catalyst is ordinarily measured in relative terms of a Weight Hourly Space Velocity (WHSV) which is calculated for the OTP conversion step on the basis of mass hourly flow rate of the sum of the mass of oxygenate reactants passed to the OTP reaction zone plus the mass of any reactive hydrocarbon material present in the feed stream or any of the recycle streams passed to the first reaction zone divided by the mass of the dual-function catalyst present in the OTP reaction zone. The WHSV for the $C_4^+$ olefin interconversion step is likewise calculated on the basis of mass hourly flow rate of the sum of the mass of $C_4^+$ olefin by-product stream passed thereto plus the mass of any reactive hydrocarbons present in any recycle stream or diluent stream passed thereto divided by the mass of the second dual-function catalyst present in the second reaction zone. Those skilled in the art will recognize that the contact time of the reactants with the catalyst is proportional to the inverse of the WHSV such that as the WHSV increases contact time decreases and conversely a decrease in WHSV produces an increase in contact time. WHSV for use in both the OTP reactors and the interconversion reactor associated with the present invention can range from about 0.1 to 100 $hr^{-1}$, with a preferred range being about 0.5 to 20 $hr^{-1}$, with best results ordinarily attained in the range of 0.5 to 10 $hr^{-1}$.

In one preferred form of the invention, both the oxygenate to propylene conversion and the $C_4^+$ olefin interconversion steps utilize the same dual-function catalyst system. Preferably, the dual-function catalyst system has the capability of converting oxygenates to propylene as well as the capability of interconverting olefins other than propylene to propylene.

Any of the catalytic materials known to the art that have the capability to catalyze these two reactions are suitable ingredients for use in the catalysts used in the present invention. The preferred dual-function catalyst system contains a molecular sieve as the active ingredient and more specifically the molecular sieve has relatively small pores characterized as not larger than those associated with the member pores of ZSM-5 and ZSM-11. Certain of the molecular sieves useful in the present invention have pores with an average effective diameter of less than 5 Å.

Suitable zeolitic molecular sieves in the calcined form may be represented by the general formula:

$$Me_{2/n}O:Al_2O_3:xSiO_2:yH_2O$$

where Me is a cation, x is the framework $SiO_2$ to $Al_2O_3$ ratio and has a value from about 2 to infinity, n is the cation valence and y has a value of about 2 to 100 or more and more typically about 2 to 25.

Zeolites which may be used include chabazite—also referred to as Zeolite D, clinoptilolite, erionite, ferrierite, mordenite, Zeolite A, Zeolite P, ZSM-5, ZSM-11, and MCM-22. Zeolites having a high silica content (i.e., those having framework silica to alumina ratios greater than 100 and typically greater than 150 with good results achieved at a silica to alumina mole ratio of about 150:1 to 800:1) are especially preferred. One such high-silica-content zeolite having the structure of ZSM-5 is silicalite, as the term used herein includes both the silicapolymorph disclosed in U.S. Pat. No. 4,061,724 and also the F-silicate disclosed in U.S. Pat. No. 4,073,865. Best results are obtained with ZSM-11 or ZSM-5 or a mixture thereof.

The most preferred zeolitic dual-function catalyst for use in both conversion steps of the present invention is a zeolite having the structural configuration of ZSM-5 or ZSM-11, sometimes in the literature referred to as having a "pentasil-type" structure.

Non-zeolitic molecular sieves useful in the dual-function catalysts used in the present invention include molecular sieves which have the proper effective pore size and are embraced by an empirical chemical composition, on an anhydrous basis, expressed by the empirical formula:

$$(EL_xAl_yP_z)O_2$$

where EL is an element selected from the group consisting of silicon, magnesium, zinc, iron, cobalt, nickel, manganese, chromium and mixtures thereof, x is the mole fraction of EL and is at least 0.005, y is the mole fraction of aluminum and is at least 0.01, z is the mole fraction of phosphorous and is at least 0.01 and x+y+z=1. When EL is a mixture of metals, x represents the total amount of the element mixture present. Preferred elements (EL) are silicon, magnesium and cobalt with silicon being especially preferred. In a preferred form of the invention the non-zeolitic molecular sieve catalyst are SAPO catalyst and even more preferably SAPO-34 or SAPO-17.

In one preferred form of the invention where the dual-function catalyst is a blend of a zeolite-type molecular sieve catalyst and a non-zeolite-type molecular sieve catalyst, the blend will contain a portion of SAPO-34 and preferably in a principal amount greater than 50% by weight. In another preferred form of the invention, the catalyst system will include a zeolitic material of a highly siliceous ZSM-5 or ZSM-11 type of material.

In another preferred form of the invention, the dual-function catalyst system is a mixture of a zeolitic catalyst with a non-zeolitic catalyst. This mixed catalyst embodiment can be accomplished either using a physical mixture of particles containing the zeolitic material with particles containing the non-zeolitic material or the catalyst can be formulated by mixing the two types of material into a suitable binding matrix in order to form particles having both ingredients present therein.

The present invention optionally uses two separate reaction zones containing particles of the dual-function catalyst described hereinbefore. In the case where the dual-function catalysts used in these two zones are of different compositions then the one used in the first reaction zone that performs the OTP conversion and $C_2$ olefin interconversion step is referred to as the first dual-function catalyst and the one used in the second reaction zone that perform the optional $C_4^+$ olefin interconversion step is called the second dual-function catalyst. In one preferred form of the invention, the same dual-function catalyst is used to catalyze both the OTP conversion and $C_2$ olefin interconversion step and the $C_4^+$ interconversion step in separate reaction zones.

The present invention further includes an optional selective hydrogenation treatment step to selectively hydrogenate highly unsaturated hydrocarbons such as dienes and/or acetylenic hydrocarbons that are formed in the OTP conversion step in minor amounts (i.e., less than 2 wt-% of the amount of oxygenate feed converted and typically about 0.01 to 1 wt-% of the amount converted). While these highly unsaturated hydrocarbons do not represent a substantial source of propylene yield loss, it has been found that they are a very significant contributor to the rate of coke deposition on the preferred dual-function catalyst. The selective hydrogenation conditions utilized in this treatment step are selected from conditions known to those of skill in the art to be effective to convert highly unsaturated hydrocarbons to the corresponding olefins while minimizing or eliminating any over-hydrogenation to the corresponding fully saturated hydrocarbon One preferred form of the present invention utilizes moving bed technology in the OTP conversion and $C_2$ olefin interconversion step and in the optional, separate $C_4^+$ olefin interconversion step in order to enhance the selectivity of the overall process for propylene production. The use of moving bed technology in a classical MTO process is known and is shown in U.S. Pat. No. 5,157,181.

Moving bed reaction zones for use in the instant invention can be configured in a number of ways, for example, the dual-function catalyst particles can be introduced to an upper section of the OTP reaction zones and fed by gravity through the entire volume of the reaction zones, wherein the dual-function catalyst is contacted, in a preferred form of the invention, a radially flowing feed stream; thus, the fluid stream or streams flow transversely to the direction of flow of the catalyst. It is contemplated, that the feed streams or by-product stream could be directed to flow in a countercurrent direction to the catalyst movement or in a concurrent direction without departing from the scope of the present invention.

More typically the dual-function catalyst particles are introduced into an annular catalyst chamber, or annular catalyst chambers, defined by concentric catalyst retaining screens that run through the reactors wherein the catalyst particles travel down through the annular catalyst chamber and are withdrawn from a lower section of these reaction zones.

During the traversal through the reactors, a carbonaceous material, i.e., coke, is deposited on the catalyst as it flows through the reactors. The carbonaceous deposit material has the effect of reducing the number of active sites on the catalyst which thereby affects the extent of the overall conversion and the selectivity to propylene. A portion of the coked dual-function catalyst is thus withdrawn from the reactors and regenerated to remove at least a portion of the coke therefrom. In the case where different dual-function catalysts are used in the OTP reaction zones and the optional $C_4^+$ interconversion reaction zone, two separate moving bed regeneration zones can be used to avoid contamination of the catalyst particles that would occur in mixing them together. A preferred embodiment is the case where two separate dual-function catalysts are used to employ common regeneration technology disclosed in U.S. Pat. No. 4,498,973 where two separate and distinct catalysts are regenerated in a single regeneration zone without commingling the catalyst particles. In the preferred case where the same catalyst particles are used in both the first and second reaction zones then the coked particles from both zones can be mixed together and charged to a common regeneration zone. It is within the scope of the present invention in this last case to charge at least a portion of the partially coked catalyst particles withdrawn from the second reaction zone to the OTP reaction zones. This can be advantageous when the selectivity of the dual-function catalyst to propylene in the first reaction zone is improved due to the partial coverage of active sites with fresh coke deposits.

The carbonaceous material is removed from the catalyst by oxidative regeneration wherein a moving bed of the catalyst particles withdrawn from the reactors is contacted with an oxygen-containing gas stream at sufficient temperature and oxygen concentration to allow the desired amount of the carbonaceous materials to be removed by combustion from the catalyst.

DETAILED DESCRIPTION OF THE DRAWINGS

The following description of a preferred embodiment of the process of the present invention is made with reference to the attached figures. In the interest of simplifying the description of the invention in order to facilitate understanding the figures do not contain representations of heaters, heat exchangers, coolers, valves, control means and other conventional items that are well known to those of ordinary skill in the chemical engineering art except where their presence is essential to the understanding of the present invention. Also, the reactor system will be discussed in the context of converting an oxygenate-containing feed stream to an olefin-containing product stream, it should be understood that other reactant feed streams could be used and particularly for reactions, such as paraffin dehydrogenation, where a low pressure drop is desired.

Figure 1:
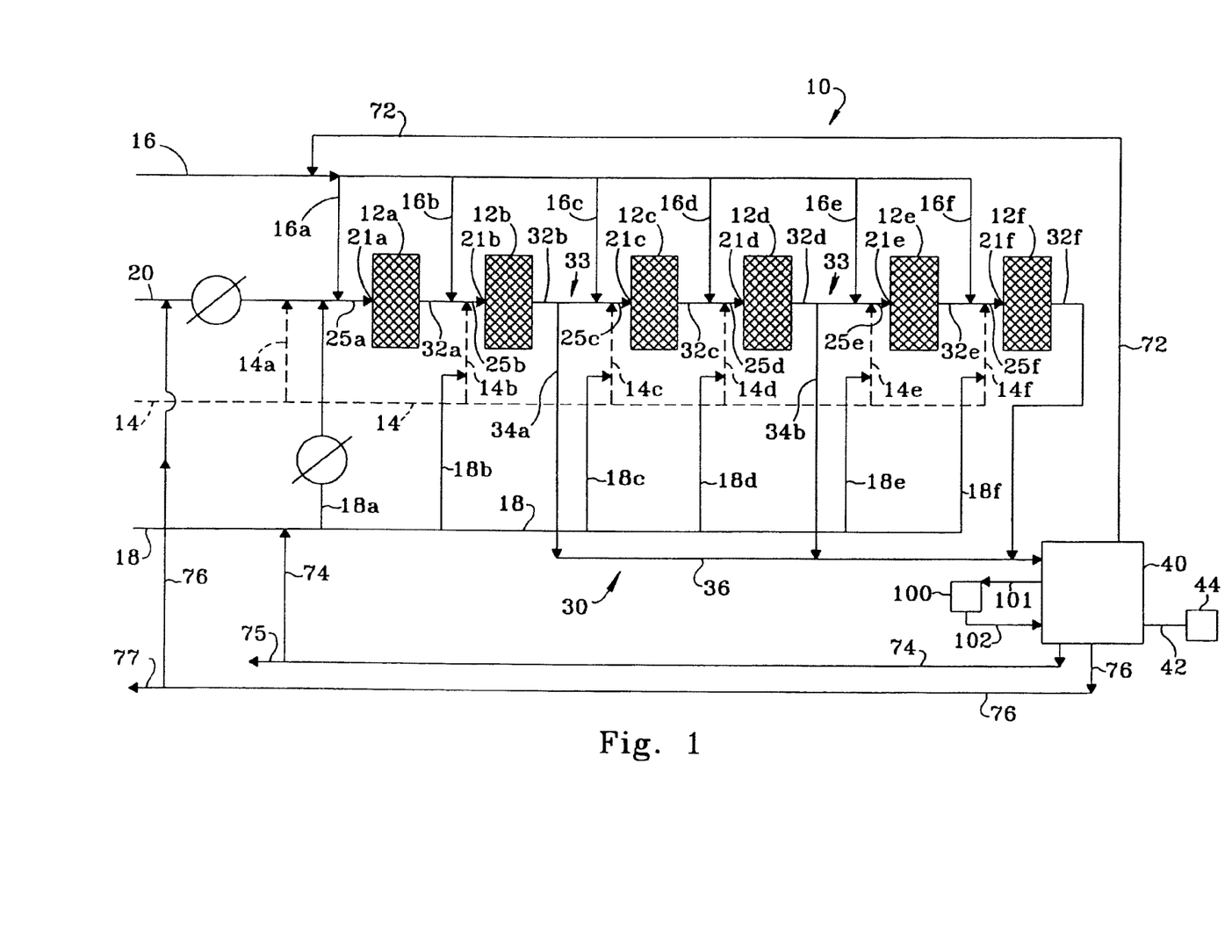
FIG. 1 is a schematic view of a process flow diagram of reactors for converting an oxygenate-containing feed stream to an olefin-containing product stream having interstage product removal.

FIG. 1 shows one preferred reactor system 10 having a train of six reactors 12a-12f, an oxygenate feed stream or feed line 14, a light olefin recycle feed stream 16, a diluent feed stream 18 and a heavy olefin recycle feed stream 20. While six reactors are shown it is contemplated utilizing any number of reactors as is practical and for example from two to twenty reactors. Feed streams 14, 16 and 18 divide into branches and are designated with an alphabetical character associated with the numeric designation of the feed stream from which they branch (e.g., 14a, 14b, etc.). In a preferred form of the invention, by dividing the feed streams into separate branches to individually feed an inlet 21a-21f of each of the reactors 12a-12f, the flow rates of the individual branch feed streams can be independently monitored and regulated. Preferably, the feed streams are regulated such that each reactor receives roughly the same flow rate of the combined feed streams 14, 16, 18 and 20 on a total volume basis and irrespective of the contribution of each individual feed stream to the total volume. Even more preferably the inlet of each reactor will also have the same flow rate for each individual feed stream to achieve roughly the same mixture of gasses at the inlet of each reactor.

While the reactor system 10 in FIG. 1 has each feed stream 14, 16, and 18 having a dedicated branch for each reactor, it is contemplated that a greater number or a lesser number of branches could be provided per reactor in any of the feed streams 14, 16, 18 and 20. Preferably, the feed streams 14, 16, 18 will combine with the feed stream 20 to form a combined feed streams 25. As shown in FIG. 1, branches of combined feed streams 25a-25f of oxygenate feed, light olefin recycle, diluent, heavy olefin recycle and product downstream of the first reactor may be combined to feed each reactor 12a-12f.

In a preferred form of the invention the ratio of number of branches to the number of reactors will be from two branches for each reactor to one branch for every six reactors. Also, while FIG. 1 shows feed streams 14, 16, and 18 having numerous branches, it should be understood that this is merely one preferred combination of feed streams having more than one branch. It is contemplated that the reactor system 10 could have from one feed stream to all of the feed streams 14, 16, 18 and 20 having more than one branch. It is also contemplated that one feed stream could have a first ratio of branches per reactor while a second feed stream could have a second ratio of branches per reactor wherein the second ratio of branches to reactors is different from the first ratio of branches to reactors.

In a preferred form of the present invention, the reactor system 10 will have a diverter 30 for diverting a portion of a product outlet or effluent stream 32a-32e flowing between two adjacent reactors, to define an interstage position 33, to a product recovery unit 40. This sometimes will be referred to herein as interstage product removal. In a more preferred form of the invention the diverter 30 will include an interstage product removal line 34a, 34b for directing a first portion of the product outlet 32a-32e exiting a first reactor to the product recovery unit 40 and a second portion of the product flow stream continues flowing through the product outlet 32a-32e to an inlet of a second adjacent reactor. The diverter 30 can be a T-shaped connector or other type member, device or mechanism for achieving the same goal of dividing an incoming stream into two outgoing streams. In one preferred form of the invention shown, the interstage product removal line 34a, 34b is provided for every two interstage positions, or, in this case, two interstage product removal lines 34a, 34b for five interstage positions 33. However, it is contemplated that as many as one interstage product removal line 34a, 34b could be provided at each interstage position or as few as one interstage product removal line 34a, 34b from one of the five interstage positions. As shown in FIG. 1, a portion of the product from the reactor 12b in a second product outlet 32b is diverted by product removal line 34a while the remaining product continues in the second product outlet 32b to reactor 12c and a portion of the product from reactor 12d in a fourth product outlet 32d is diverted by product removal line 34b while the remaining product continues in the fourth product outlet 32d to reactor 12e.

In one preferred form of the invention, the diverter 30 will withdraw from 30-75% of the product outlet 32a-32e at interstage position 33 and more preferably from 40-70%. The diverters allow removal of product at interstage positions downstream of an upstream reactor 12a-12e and before entering a downstream reactor 12b-12f. The same volume of new feed can be added to the downstream reactor 12b-12f as product is removed from the upstream reactor 12a-12e. Consequently, downstream reactors do not have to be sized larger than upstream reactors to accommodate additions of new feed.

Product removal lines 34a, 34b and the product outlet 32a-32f from the final reactor in the series to feed a combined effluent line 36 which connects in fluid communication to the product recovery section or unit 40. The product recovery unit 40 separates the desired product components, in this embodiment, propylene, from other effluent components in the effluent and conveys the propylene through a line 42 to a storage tank 44. The product recovery unit 40 also separates water from the effluent and conveys the water through a diluent recycle line 74 into the feed stream 18. The product recovery unit 40 also separates ethylene from the effluent and conveys the recycled ethylene through an ethylene recycle line 72 into the feed stream 16. The product recovery unit 40 also separates heavy hydrocarbons from the effluent and conveys a heavy olefin recycle stream 76 into the feed stream 20.

FIG. 1 also shows an optional heavy olefin interconversion reactor 100 connected through line 101 to the product recovery unit 40. An effluent from the reactor 100 is conveyed through line 102 back to the product recovery unit 40.

As for the content of the feed streams 14, 16, 18 and 20, the oxygenate feed stream 14 will contain, in a preferred form of the invention, one, some or all of methanol, dimethyl ether (DME), ethanol, diethyl ether, methylether, formaldehyde, dimethyl ketone, acetic acid, and mixtures thereof. In a most preferred form of the invention, the oxygenate feed stream 14 will contain methanol or dimethylether or mixtures thereof.

The feed stream 16 has hydrocarbons having fewer than 3 carbons and included ethylene, ethane, ethyne, and methane. Most preferably, the feed stream 16 contains primarily ethylene. This feed stream will, preferably, be divided into $\frac{1}{6}^{th}$ portions and delivered through lines 16a-16f to an inlet of each reactor. The feed stream 16 will have a temperature at an inlet of the reactor system 10 of from 50° to 150° C.

The feed stream 18 will preferably be water at a flow rate of 40-200 metric tons per hour (MTH) and at a temperature of 8° to 100° C. The feed stream 18 is divided into six separate streams each having approximately $\frac{1}{6}^{th}$ the flow rate of the feed stream 18 prior to dividing into separate branches and delivered through lines 18a-18f via lines 14a-14f, respectively, to an inlet of each respective reactor.

The feed stream 20 will preferably contain hydrocarbons having greater than 3 carbons or a molecular weight greater than propylene. Suitable heavy olefins include regular, secondary, iso and tertiary butane, butene, pentane, pentene, hexane, heptane, heptene, octane, and octene; cyclic and bicyclic compounds including cyclobutane, cyclobutene, cyclopentane, cyclopentene, cyclohexane, and cyclohexene; dienes, aromatic hydrocarbons and others. The flow rate of this feed stream, preferably, is routed to the first reactor 12a and flows to subsequent reactors 12b-12f serially to act as a heat sink for limiting temperature rise due to the heat of the reaction. However, the feed stream 20 could be divided to provide separate flow rates to two or more reactors. The temperature of the feed stream 20 at an inlet of the reactor system 10 should be from 200° to 500° C.

A catalyst will be provided under pressure into each reactor 12a-12f to contact the combined feed stream. It is contemplated using those technologies well known in the art to provide catalyst under pressure to a reactor including: fluidized bed, moving bed or batch type catalyst distribution systems. In one preferred form of the invention the reactors will contain a moving bed catalyst system.

As for the type of catalyst, for the reactors 12a-12f, it is contemplated utilizing any of the zeolite-type and non-zeolite-type molecular sieve catalyst and more preferably the zeolite-type catalyst and most preferably ZSM 5 or ZSM II or mixtures of the same.

Figure 2:
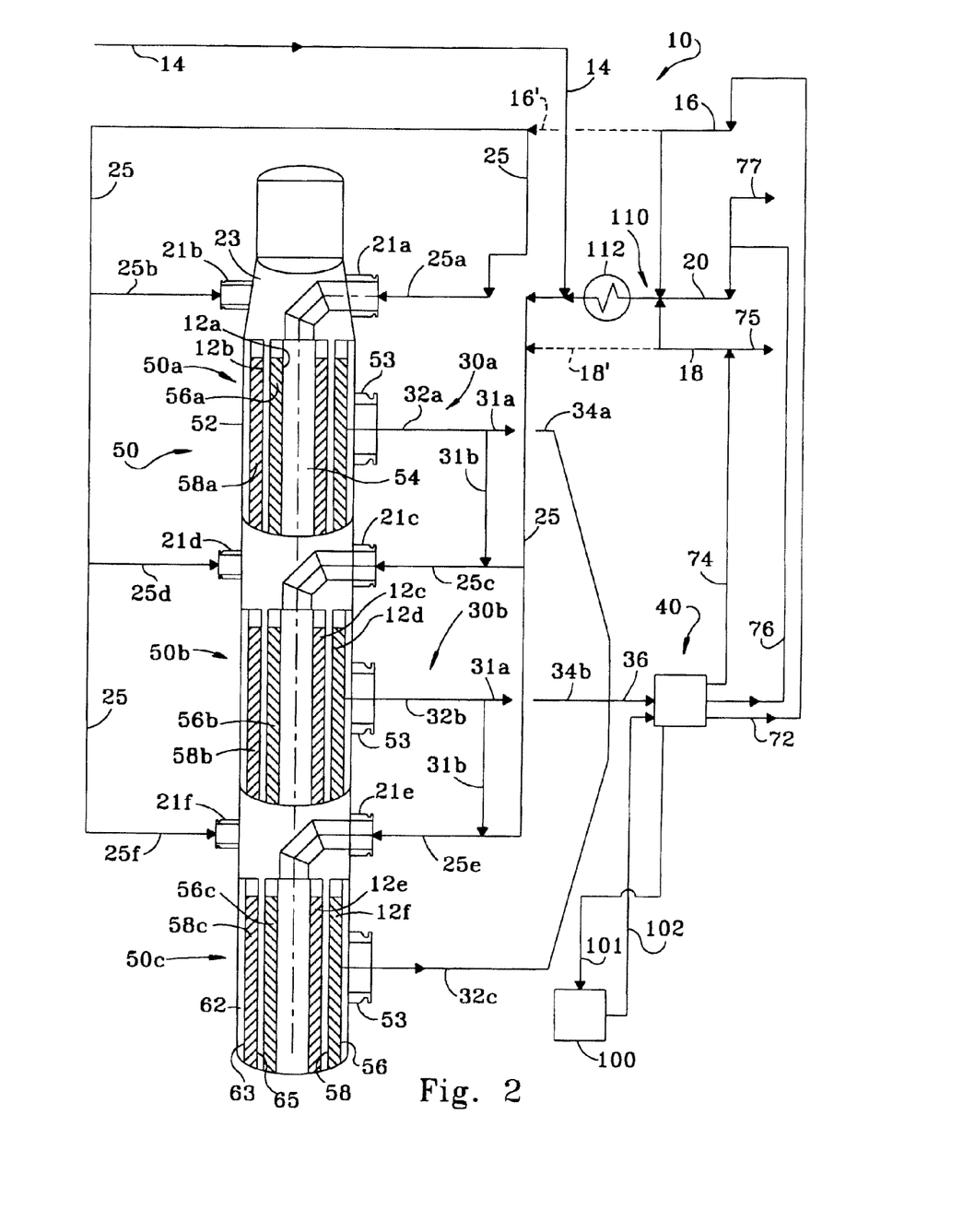
FIG. 2 is a side elevation view in partial vertical cross-section of a six bed concentric radial flow reactor with interstage product removal.
Figure 3:
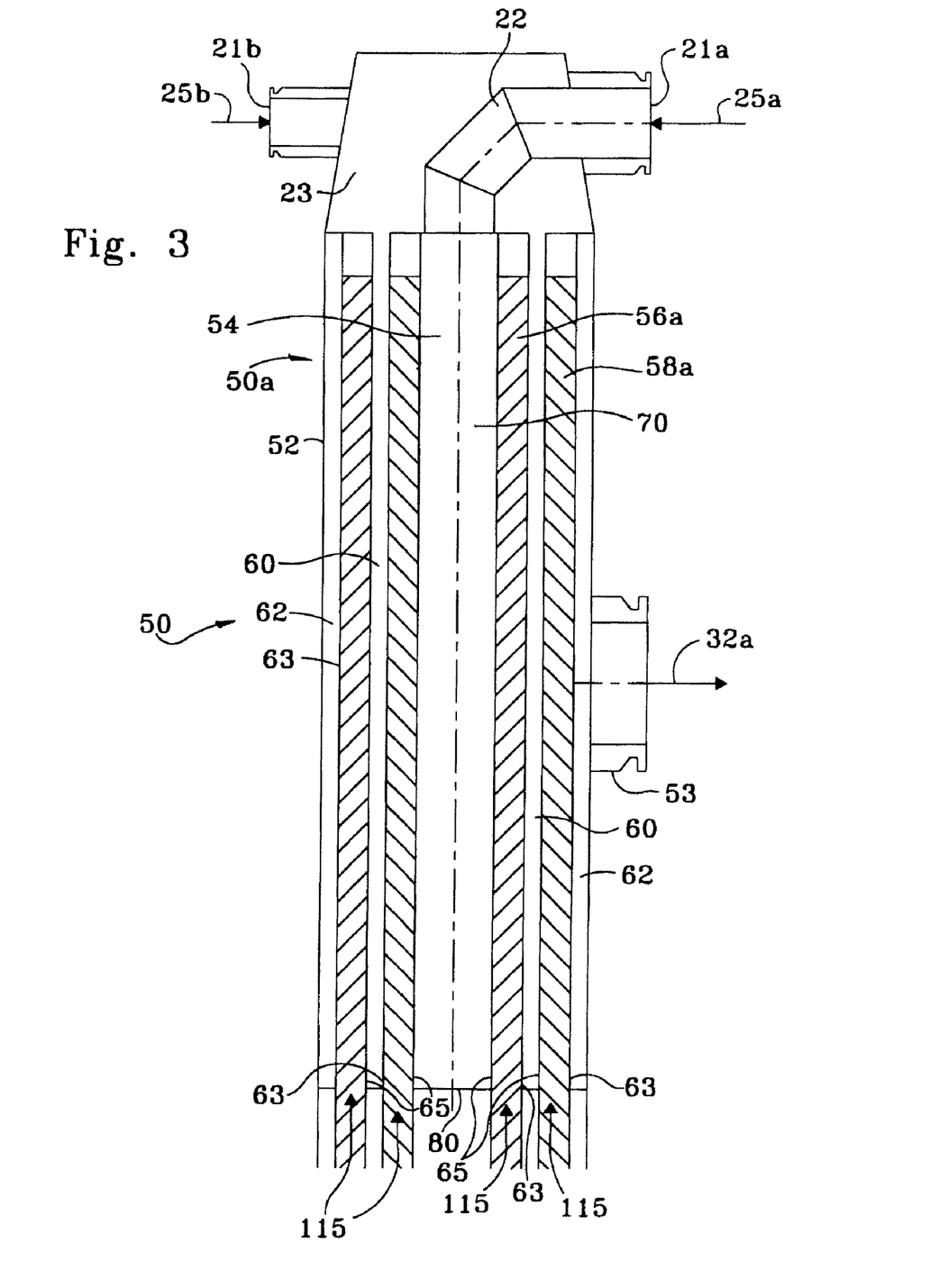
FIG. 3 is a side elevation view in partial vertical cross-section of a segment of the reactor shown in FIG. 2.

FIGS. 2 and 3 show one preferred form of the reactor system 10, having a reactor vessel 50 having an outer wall 52. The reactor vessel 50 has three reactor sections, a first reactor section 50a, a second reactor section 50b and a third reactor section 50c with interstage product removal through lines 34a, 34b positioned at interstage locations between the three stacked reactor sections. Each reactor section 50a, 50b, 50c contains two concentrically disposed catalyst beds 56, 58 constituting the reactors 12a-12f. The reactor section 50a houses the reactors 12a, 12b (FIG. 3), the reactor section 50b houses the reactors 12c, 12d, and the reactor section 50c houses the reactors 12e, 12f.

Combined feed stream in line 25 receives oxygenate feed stream from line 14, light olefin recycle feed stream from line 16, diluent feed stream from line 18 and heavy olefin recycle feed stream from line 20. The combined feed stream in line 25 supplies feed stream lines 25a-f which feed portions of combined feed to inlets 21a-f, respectively. Additionally, FIG. 2 shows that the feed streams 16, 18, and 20 can be either be combined together in any desired combination at a location 110 and passed through a heat exchanger 112. A portion or all of the feed streams 16 and 18 can bypass the heat exchanger through bypass lines 16' and 18'. However, it is desirable for the feed stream 20 to pass through the heat exchanger 112 so that the stream will be at the proper temperature to act as a heat sink in the reactors.

The reactor system 10 has the outer wall 52 defining an inner chamber 54. Extending vertically through the inner chamber 54 of each of the reactor sections 50a, 50b, 50c and with exemplary reference to the reactor section 50a shown in FIG. 3 is a first annular catalyst chamber 56a comprising reactor 12a and a second annular catalyst chamber 58a comprising reactor 12b spaced axially outwardly from the first annular catalyst chamber 56a. The first annular catalyst chamber is concentrically positioned with respect to the second annular catalyst chamber 58a and both of the annular catalyst chambers 56a, 58a may be cylindrical. The first and second annular catalyst chambers 56a, 58a guide and contain the flow of a catalyst material through the reactor system 10.

A first annular collection chamber 60 is positioned between the first and second annular catalyst chambers 56a, 58a, and a second annular collection chamber 62 is concentrically positioned about the second annular catalyst chamber 58a and separates an outer wall 63 of the second annular catalyst chamber 58a from an inner surface of the outer wall 52. The first and second annular catalyst chamber 56a, 58a can accommodate a fluidized bed or a moving bed type catalyst flow system. The first and second annular catalyst chambers 56a, 58a each have an outer wall 63 and an inner wall 65. The outer wall 63 and the inner wall 65 should be perforated to allow for the passage of a fluid such as the combined feed stream 25 through the walls while containing and guiding the flow of a particulate material such as a catalyst through a desired portion of the reactor system 10. The outer wall 63 and the inner wall 65 can be constructed from a mesh, porous or screen-like materials. Although, the embodiment is shown to be inward radial flow, outward radial flow is also contemplated.

First, third and fifth portions of the combined feed stream 25a, 25c and 25e exit the first, third and fifth outlets and enter the first, third and fifth inlets 21a, 21c and 21e, respectively, and are directed to a centerpipe 70 before entering the annular catalyst chamber 56a, 56b and 56c, respectively. This arrangement is best viewed in FIG. 3 which only shows the arrangement of the first reactor section 50a. As shown in FIG. 3, the centerpipe 70 is coaxially disposed within the first annular catalyst chamber 56a of the reactor sections 50a and the centerpipe 70 receives a first portion of the combined feed stream 25a from the inlet 21a. The centerpipe 70 is defined by a fluid permeable wall, so feed can radially exit into the first annular catalyst chamber 56a without catalyst permeating the wall of the centerpipe 70. The first portion of the combined feed stream 25a enters the inlet 21a and is directed through a duct 22 preferably bending and extending through a distribution manifold 23 to the centerpipe 70 and then flows radially outwardly through the inner wall 65 into the first annular catalyst chamber 56a and in contact with any catalyst therein to provide a first product. The first product exits through the outer wall 63 then flows into the first annular collection chamber 60.

Second, fourth and sixth portions of the combined feed stream 25b, 25d and 25f exit second, fourth and sixth outlets and enter second, fourth and sixth inlets 21b, 21d, and 21f, respectively, and are directed to the distribution manifold 23 before entering the first annular collection chamber 60. With exemplary reference to the first reactor section 50a of FIG. 3, the first product from first annular catalyst chamber 56a mixes with a second portion of the combined feed stream 25b in the first annular collection chamber 60, and passes through the inner wall 65 of the second annular catalyst chamber 58a and into contact with catalyst therein to generate a second product. The second product passes through the outer wall 63 then into the second annular collection chamber 62 and finally exits the reactor through a reactor outlet nozzle 53 to a first product outlet 32a. This flow scheme is the same for each of the reactor sections 50a, 50b, 50c. The reactor section 50b contains the third annular catalyst chamber 56b and fourth annular catalyst chamber 58b and the reactor section 50c contains the fifth annular catalyst chamber 56c and sixth annular catalyst chamber 58c.

Two diverters 30 are shown in FIG. 2 where a first diverter 30a is positioned at the first product outlet 32a and a second diverter 30b is positioned at the second product outlet 32b. The diverter 30a, 30b are located proximate to the respective reactor outlet nozzle 53. The diverters are, in one preferred form of the invention, a T-shaped pipe connection having an inlet in fluid communication with the product outlet 32b, 32d and the T-shaped pipe having two outlets, one outlet 31a in fluid communication with line 34a, 34b and the other outlet 31b in communication with the next reactor 12. In a preferred form of the invention each outlet 31a, 31b will have a valve associated therewith to control the flow rate of an effluent therethrough. Preferably, a first portion of the second product outlet 32b is directed to the next reactor section (50b or 50c) and a second portion is directed through line 34a, 34b to the product recovery unit 40. The product recovery unit 40 will utilize techniques and equipment well known in the art to separate propylene from other hydrocarbons and any diluent such as water and transfer the desired product, such as propylene, through the line 42 to the storage tank 44.

In a preferred form of the reactor system 10, the product recovery unit 40 is also capable of separating the combined product stream in the effluent line 36 into separate effluent streams—the ethylene recycle line 72, the diluent recycle line 74, and the heavy olefin recycle stream 76. The streams are fed back into the reactor vessel 50 as described above.

FIG. 2 also shows an optional selective hydrogenation reactor or the reactor 100 or both a hydrogenation reactor and an interconversion reactor. As is set forth above, a selective hydrogenation reactor is optionally provided to selectively hydrogenate highly unsaturated hydrocarbons such as dienes and/or acetylenic hydrocarbons that are formed in the OTP conversion step in minor amounts. The operation of such a hydrogenation reactor is discussed above.

An interconversion reactor, preferably, is capable of converting non-propylene hydrocarbons having fewer than three carbon atoms or four carbon atoms or greater into propylene. It is also contemplated that the reactor 100 be an olefin cracking reactor for cracking a $C_4^+$ olefin cut to $C_2$ and $C_3$ olefins. The reactor 100 preferably utilizes moving bed, fluidized bed, or batch type reactor systems. Further, the optional reactor 100 will utilize a catalyst, more preferably a dual-function catalyst and more preferably a zeolite-type molecular sieve catalyst, a non-zeolite-type molecular sieve catalyst or a blend of a zeolite-type molecular sieve catalyst and a non-zeolite-type molecular sieve catalyst. In one preferred form of the invention, the optional reactor 100 will utilize the same catalyst as in the reactor vessel 50, and even more preferably will share both the same catalyst system and the same catalyst regenerator (not shown). Olefin interconversion reactors are discussed above in greater detail.

FIG. 2 further shows line 101 delivering an appropriate cut from the product recovery unit 40 to the reactor 100. An interconversion effluent is conveyed in a line 102 from the optional reactor 100 to the product recovery unit 40.

FIG. 3 shows the reactor section 50a having a terminal wall 80 having annular passages 115 to allow for the passage of catalyst material from adjacent reactors, i.e., the reactor section 50a to the reactor section 50b and from the reactor section 50b to the reactor section 50c. The terminal wall 80, however, prevents the flow of any of the combined feed stream 25 in the centerpipe 70 and feed and product in the annular collection chambers 60, 62 to be transferred from one reactor section to another. Thus, the terminal wall 80 seals off inlet or the centerpipe 70 and annular collection chambers 60, 62 but allows catalyst to pass downwardly from the annular catalyst chambers 56a, 58a. Consequently, catalyst can be continuously moved between reactor sections 56a-56c and circulated to a catalyst regenerator for recirculation back to reactor sections 56a-56c. It would be most feasible to remove spent catalyst from the bottom of reactor section 56c and return regenerated catalyst to the top of reactor section 56a. The regenerator and recirculation equipment is not shown in the drawings. Spherical catalyst is the preferred shape for use in moving catalyst bed reactors.

The reactor system of FIG. 2 offers the benefit of reducing the pressure drops that are known to occur in other reactor systems and to increase the yield of propylene. The following examples show that a computer simulation of a reactor system having three reactors connected together with each reactor having two catalyst beds has a substantially lower pressure drop when compared to a reactor system having six separate reactors each having a single catalyst bed.

EXAMPLE 1

A computer simulation was conducted of an OTP reactor system having three reactor units each having two reactor beds per unit as essentially shown in FIGS. 2 and 3. The flow rates of the feed streams 14, 16, 18, and 20 were set as shown in Table 1.

TABLE 1

| Feed stream | Flow Rate, metric ton/hr |
|---|---|
| 14 | 188 |
| 16 | 48 |
| 18 | 45 |
| 20 | 110 |

The feed streams shown above were divided and fed to each reactor, and the product removal lines 34a, 34b were set in such a way that a total feed stream 25 to each reactor and an outlet temperature resulted for each reactor, as shown in Table 2.

TABLE 2

| Reactor | Total Feed to Reactor, metric tons/hour | Outlet Temperature of Reactor, ° C. |
|---|---|---|
| 12a | 184 | 490 |
| 12b | 252 | 490 |
| 12c | 135 | 490 |
| 12d | 174 | 490 |
| 12e | 116 | 490 |
| 12f | 155 | 501 |

The deviation of outlet temperature from each reaction zone is minimal.

The pressure drop across each reactor and related piping was calculated. The total pressure drop across the system was found to be 8.9 psi, and the average outlet pressure for all the reactors was found to be 10.8 psig.

EXAMPLE 2

A computer simulation was conducted of an OTP reactor system having six reactors connected with each other as shown in FIG. 1 and each reactor having a single catalyst bed. The feed streams 14, 16, 18, and 20 were set as shown in Table 3.

TABLE 3

| Feed stream | Total Flow, metric tons/hr. |
|---|---|
| 14 | 188.6 |
| 16 | 52 |
| 18 | 45.1 |
| 20 | 110 |

The feed streams shown above were divided to each reactor 12a-12f, and the product removal lines 34a, 34b were set in such a way that a total feed stream 25 to each reactor and an outlet temperature resulted for each reactor, as shown in Table 4:

TABLE 4

| Reactor Bed No. | Total Feed to Reactor, metric tons/hr. | Outlet Temperature of Reactor, C. |
|---|---|---|
| 12a | 187 | 490 |
| 12b | 256 | 490 |
| 12c | 135 | 490 |
| 12d | 175 | 490 |
| 12e | 116 | 490 |
| 12f | 154 | 497 |

The pressure drop across each reactor and related piping was calculated. The total pressure drop across the system was found to be 16.9 psi, and the averaged outlet pressure for all the reactors was found to be 14.5 psig. The outlet temperature is maintained with minimal temperature variation among the reactors, but the pressure and pressure drop is greater in the embodiment of FIG. 1 than in the embodiment of FIGS. 2 and 3. The lower pressure drop across the system of Example 1 and the lower operating pressure of the system of Example 1 is desirable and demonstrates some benefits of a concentric flow reactor over a conventional reactor in series.

What is claimed is:

1. An oxygenate to propylene reactor system comprising:
a plurality of reactors connected in fluid flow communication and having at least one pair of reactors separated by an interstage position;
a feed line for supplying a reactant feed stream comprising at least one oxygenated compound separately to an inlet of more than one of the plurality of reactors; and
a diverter in fluid communication with the interstage position and capable of directing a first portion of a product stream comprising propylene exiting one reactor in said pair of reactors to a first location and a second portion of the product stream to an inlet of another reactor in said pair of reactors;
wherein a first reactor of the plurality of reactors comprises a first annular catalyst chamber and a second reactor of the plurality of reactors comprises second annular catalyst chamber and the first annular catalyst chamber is concentrically disposed within the second annular catalyst chamber.

2. The system of claim 1 further comprising a first annular collection chamber positioned between the first annular catalyst chamber and the second annular catalyst chamber and a second annular collection chamber defined about the second annular catalyst chamber.

3. The system of claim 1 wherein an effluent from the first annular catalyst chamber is fed to the second annular catalyst chamber.

4. The system of claim 2 wherein the feed line is in fluid communication with a first inlet to the first annular catalyst chamber and in fluid communication with a second inlet to the second annular catalyst chamber.

5. The system of claim 1 wherein the first location is a product recovery section capable of separating the product components.

6. The system of claim 1 wherein a third reactor of the plurality of reactors comprises a third annular catalyst chamber and a fourth reactor of the plurality of reactors comprise a fourth annular catalyst chamber, and a catalyst may flow from the first annular catalyst chamber to the third annular catalyst chamber, and from the second annular catalyst chamber to the fourth annular catalyst chamber.

7. The system of claim 6 wherein the feed line feeds a pipe comprising a fluid permeable wall in fluid communication with said first annular catalyst chamber.

8. The system of claim 7 wherein the feed line further feeds a distribution manifold in communication with said second annular catalyst chamber.

9. The system of claim 8 wherein the pipe extends through the distribution manifold.

* * * * *